United States Patent
Limber et al.

(10) Patent No.: US 9,432,831 B2
(45) Date of Patent: *Aug. 30, 2016

(54) METHOD AND ARRANGEMENT FOR GRACE PERIOD CONTROL ASSOCIATED WITH A SERVICE LEVEL IN A CELLULAR COMMUNICATIONS SYSTEM

(71) Applicant: Telefonaktiebolaget L M Ericsson (publ), Stockholm (SE)

(72) Inventors: Andreas Limber, Ljunggsbro (SE); Anders Nordlund, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,378

(22) Filed: Feb. 2, 2015

(65) Prior Publication Data
US 2015/0148000 A1 May 28, 2015

Related U.S. Application Data

(63) Continuation of application No. 13/818,214, filed as application No. PCT/EP2011/063698 on Aug. 9, 2011, now Pat. No. 8,948,722.

(60) Provisional application No. 61/393,623, filed on Oct. 15, 2010, provisional application No. 61/379,120, filed on Sep. 1, 2010.

(30) Foreign Application Priority Data

Oct. 8, 2010 (EP) ..................................... 10186938

(51) Int. Cl.
*H04M 11/00* (2006.01)
*H04W 4/26* (2009.01)
(Continued)

(52) U.S. Cl.
CPC ............ *H04W 4/26* (2013.01); *H04L 41/5019* (2013.01); *H04L 43/0882* (2013.01);
(Continued)

(58) Field of Classification Search
CPC . H04W 4/26; H04W 28/0268; H04W 28/08; H04W 28/02; H04W 28/22; H04W 28/28; H04W 72/00; H04W 24/10
USPC ......... 455/450, 451, 452.1, 452.2, 453, 405, 455/67.11, 423, 414.1
See application file for complete search history.

(56) References Cited

U.S. PATENT DOCUMENTS 6,701,342 B1  3/2004  Bartz et al.
2009/0012918 A1  1/2009  Aron et al.
(Continued)

FOREIGN PATENT DOCUMENTS

WO  0190957 A1  11/2001
WO  2007093638 A1  8/2007

*Primary Examiner* — Jean Gelin
(74) *Attorney, Agent, or Firm* — Coats & Bennett, PLLC (57) ABSTRACT

A method in a telecom node for controlling a grace period associated with a licensed capacity usage in the telecom node is provided. The telecom node is comprised in a cellular telephone network. The licensed capacity usage is associated with a capacity license limit. The telecom node measures over a specific amount of time, the capacity usage in the telecom node overshooting the capacity license limit. When the measured capacity usage exceeds a preset value of an allowed capacity usage overshoot, the telecom node triggers a grace period of the licensed capacity usage at the expiry of the specific amount of time. During the grace period capacity usage overshoot is allowed. Upon expiry of said grace period the licensed capacity usage is enforced according to the capacity license limit unless the licensed capacity usage is increased.

12 Claims, 6 Drawing Sheets

(51) Int. Cl.
  *H04L 12/24* (2006.01)
  *H04L 12/26* (2006.01)
  *H04L 12/813* (2013.01)
  *H04L 12/801* (2013.01)
  *H04W 24/10* (2009.01)
  *H04W 72/00* (2009.01)

(52) U.S. Cl.
  CPC .............. *H04L 47/20* (2013.01); *H04L 47/29* (2013.01); *H04L 47/14* (2013.01); *H04W 24/10* (2013.01); *H04W 72/00* (2013.01)

(56) References Cited

U.S. PATENT DOCUMENTS

| | | |
|---|---|---|
| 2009/0055835 A1 | 2/2009 | Zhu |
| 2011/0019551 A1 | 1/2011 | Adams et al. |
| 2012/0324091 A9 | 12/2012 | Raleigh et al. |
| 2012/0327779 A1 | 12/2012 | Gell et al. |

METHOD AND ARRANGEMENT FOR GRACE PERIOD CONTROL ASSOCIATED WITH A SERVICE LEVEL IN A CELLULAR COMMUNICATIONS SYSTEM

This application is a continuation of U.S. patent application Ser. No. 13/818,214, filed Feb. 21, 2013, which is a national stage application of PCT/EP2011/063698, filed Aug. 9, 2011, which claims the benefit of U.S. Provisional Application Ser. No. 61/393,623 filed Oct. 15, 2010, EP Application No. 10186938.6, filed Oct. 8, 2010, and U.S. Provisional Application Ser. No. 61/379,120, filed Sep. 1, 2010, the disclosures of each of which are incorporated herein by reference in their entirety.

The present invention relates to a telecom node and method in a telecom node. In particular, it relates to improvements of controlling a grace period associated with a licensed capacity usage in the telecom node.

BACKGROUND

In a typical cellular radio system, also referred to as a wireless communication system, user equipments, also known as mobile terminals and/or wireless terminals communicate via a Radio Access Network (RAN) to one or more core networks. The user equipments may be mobile stations or user equipment units such as mobile telephones also known as "cellular" telephones, and laptops with wireless capability, e.g., mobile termination, and thus may be, for example, portable, pocket, hand-held, computer-included, or car-mounted mobile devices which communicate voice and/or data with the radio access network.

The radio access network covers a geographical area which is divided into cell areas, with each cell area being served by a base station, e.g., a Radio Base Station (RBS), which in some networks is also called "eNB", "eNodeB", "NodeB" or "B node" and which in this document also is referred to as a base station. A cell is a geographical area where radio coverage is provided by the radio base station equipment at a base station site. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

A cellular telephone network according to the Long Term Evolution (LTE) specifications is an example of a telecom network of today. The LTE specifications can be seen as an evolution of the current wideband code division multiple access (WCDMA) specifications. An LTE system uses orthogonal frequency division multiplex (OFDM) as a multiple access technique (called OFDMA) in the downlink (DL) from system nodes to user equipments (UEs). LTE channels are described in 3GPP, as well as Physical Channels and Modulation, among other specifications. An International Mobile Telecommunications-Advanced (IMT-Advanced) communication system uses an internet protocol (IP) multimedia subsystem (IMS) of an LTE, high-speed packet access (HSPA), or other communication system for IMS multimedia telephony (IMT). In the IMT advanced system (which may be called a "fourth generation" (4G) mobile communication system), bandwidths of 100 MHz and larger are being considered. The Third Generation Partnership Project (3GPP) promulgates the LTE, HSPA, WCDMA, and IMT specifications, and specifications that standardize other kinds of cellular communication systems.

Telecom nodes such as base stations are allotted a limited amount of capacity usage in the form of licenses from operators of telecommunication networks. The capacity usage is in the form of a number of a specific resource, such as a number of Radio Resource Control (RRC) connected users, an amount of Mbits/second, a number of physical resource blocks, etc. Often a grace period is used for a license. The concept "grace period" refers to methods and mechanisms for enabling the operators of telecommunication networks to use soft capacity license limits. When a capacity license limit is reached and exceeded, a time-limited grace period is started. After the time limit has passed, the capacity license is enforced, unless an increase in the capacity license is purchased and installed or activated. In that case, the grace period is reset and it will be possible for the operator to use the grace period again with the new licensed capacity level or new amount of capacity usage.

Existing grace period solutions are not guaranteed to automatically provide the intended usefulness for telecom operators, since a grace period may be triggered in the wrong situations. Examples of wrong situations are capacity usage spikes, as opposed to prolonged and sustained capacity usage increases.

SUMMARY

It is therefore an object of embodiments herein to provide an improved way of handling licensed capacity usage.

According to a first aspect, the object is achieved by a method in a telecom node for controlling a grace period associated with a licensed capacity usage in the telecom node. The telecom node is comprised in a cellular telephone network. The licensed capacity usage is associated with a capacity license limit. The telecom node measures over a specific amount of time, the capacity usage in the telecom node overshooting the capacity license limit. When the measured capacity usage exceeds a preset value of an allowed capacity usage overshoot, the telecom node triggers a grace period of the licensed capacity usage at an expiry of the specific amount of time. During the grace period capacity usage overshoot is allowed. Upon expiry of said grace period the licensed capacity usage is enforced according to the capacity license limit unless the licensed capacity usage is increased.

According to a second aspect, the object is achieved by a telecom node for controlling a grace period associated with a licensed capacity usage in the telecom node. The telecom node is comprised in a cellular telephone network. The licensed capacity usage is associated with a capacity license limit. The telecom node comprises a control processor configured to measure over a specific amount of time, the capacity usage in the telecom node overshooting the capacity license limit. The control processor is further configured to, when the measured capacity usage exceeds a preset value of an allowed capacity usage overshoot, trigger a grace period of the licensed capacity usage at the expiry of the specific amount of time. During the grace period capacity usage overshoot is allowed. Upon expiry of said grace period the licensed capacity usage is enforced according to the capacity license limit unless the licensed capacity usage is increased.

Since the overshoot of capacity usage is measured over a time period, i.e. over a specific amount of time, instead of instantaneously, the triggering of the grace period is avoided in unwanted situations such as small usage spikes, which results in an improved way of handling licensed capacity usage.

A further advantage with embodiments herein is that it allows operators to use the grace period for knowing how large capacity usage a specific node needs a license for, to operate at its maximum potential. Manual handling of such situations can thus be avoided, lowering the both operators' and telecom vendors' administration costs.

BRIEF DESCRIPTION OF THE DRAWINGS

The invention is described in more detail with reference to attached drawings illustrating exemplary embodiments of the invention and in which.

DETAILED DESCRIPTION

An intention of embodiments herein is to provide flexibility and to allow operators to see the capacity usage levels of telecom nodes in their telecom networks, and so that the telecom nodes can obtain the appropriate capacity usage licenses for license-controlled nodes.

Some embodiments herein comprise a secure function for determining when the operator will get a reset of the grace period. With such a function, the risks of misuse are far less.

Embodiments are exemplified in the following non-limiting description.

Figure 1:
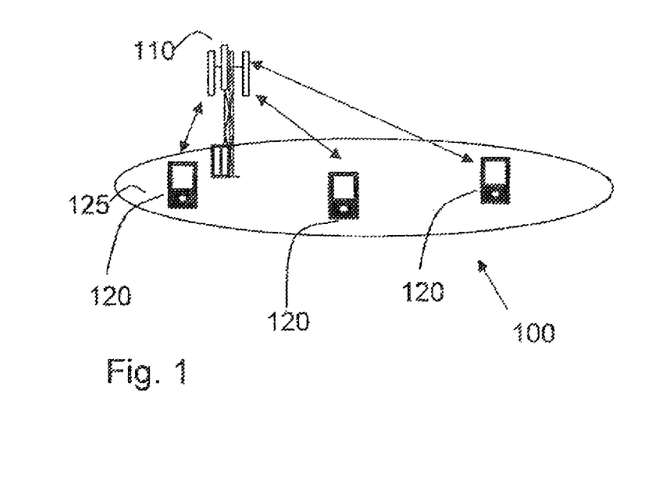
FIG. 1 is a schematic block diagram illustrating a cellular telephone network in which embodiments herein are implemented.

FIG. 1 depicts a cellular telephone network 100 in which embodiments herein may be implemented. The communications system 100 may be an LTE communications system, radio access network (RAN), a WCDMA RAN, a Global System for Mobile communication (GSM) RAN, or any other wireless communications system.

The cellular telephone network 100 comprises a telecom node 110. The telecom node 110 may be a radio base station such as an eNB, eNodeB or any other network unit capable of communicating over radio carriers with user equipments 120 being present in cell 125, which cell 125 is served by the telecom node 110.

The telecom node 110 is capable of communicating with the user equipments 120 in the cell 125 over the radio carrier, i.e. over uplink (UL) and downlink (DL) channels. The user equipments 120 may be terminals, e.g. mobile terminals or wireless terminals, mobile phones, computers such as e.g. laptops, Personal Digital Assistants (PDA), or any other radio network units capable of communicating with a telecom node such as a base station over an air interface.

For communicating with the user equipments 120 over the air interface, capacity usage is required in the telecom node 110, therefore the telecom node 110 is arranged to obtain licensed capacity usage from an operator of the cellular telephone network 100 such as e.g. from an Operational Support Systems (OSS) node 130 of the operator. The licensed capacity usage is associated with a capacity license limit. This means that the telecom node 110 can communicate with the user equipments 120 using capacity up to the capacity license limit. The capacity license limit may for example be associated with a specific number of users, i.e. of user equipments 120 communicating at the same time, how much bandwidth in Mbit/s of simultaneous data throughput the telecom node 110 is allowed to have, or how many Watts of output power the telecom node 110 is allowed to transmit with. The number of user equipments 120 communicating with the telecom node 110 at the same time varies over time, therefore capacity usage also varies over time.

Figure 2:
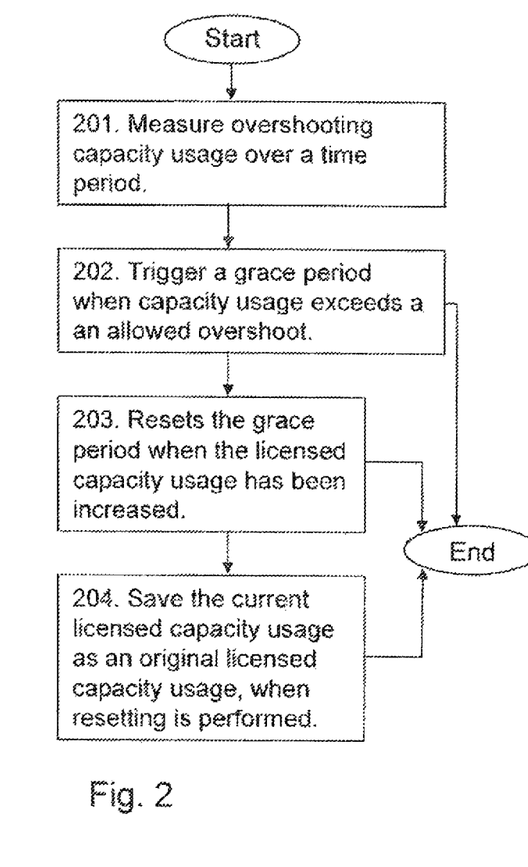
FIG. 2 is a flowchart illustrating embodiments of a method.

Embodiments herein relating to a method in the telecom node 110 for controlling a grace period associated with a licensed capacity usage in the telecom node 110 will now be described with reference to the flowchart depicted in FIG. 2. As mentioned above, the telecom node 110 is comprised in the cellular telephone network 100, and the licensed capacity usage is associated with a capacity license limit.

The telecom node 110 is communicating with a number of user equipments 120 applying capacity usage that varies over time depending on the number of communicating user equipments 120 and what resources they require for the communication. The method comprises the following steps, which steps may as well be carried out in another suitable order than described below.

Step 201

The telecom node 110 uses a grace period control mechanism that involves monitoring the momentary capacity usage in the telecom node 110. Therefore, in this step, the telecom node 110 measures in the telecom node 110, the capacity usage overshooting the capacity license limit. The measurement is performed over a specific amount of time. This time period may e.g. be one hour, 24 hours, 48 hours, seven days or whichever timeframe is deemed most relevant for showing consistent usage. According to some embodiments, the telecom node 110 may keep a list of the limited licensed resource, i.e. the capacity license limit, so that the capacity usage overshooting the capacity license limit can be collected and measured.

In some embodiments, the telecom node 110 is a base station. In these embodiments, this step of measuring is based on determining a load of the base station by monitoring a buffer status in the base station.

The telecom node 110 may be an eNodeB in a telecom network according to LTE. In one embodiment this step of measuring may be based on counting resource blocks and/or resource elements transmitted in a subframe, frame, or group of frames.

In other embodiments this step of measuring is based on counting the number of user equipments 120 connected to the eNodeB.

The artisan will understand, of course, that the measurements may be arranged to be done remotely, which is to say that one node may monitor the capacity usage of another node, although doing so may affect the available capacity usage of either or both such nodes.

Step 202

For a prolonged and sustained capacity usage increase, the grace period is triggered by the telecom node 110. Upon expiry of the grace period, the licensed capacity usage is enforced, whereby the available capacity is locked to the licensed level, i.e. the capacity license limit, unless an increase in the capacity license limit is obtained, i.e. purchased, and installed.

Therefore, when the measured capacity usage exceeds a preset value of an allowed capacity usage overshoot, the telecom node 110 triggers the grace period of the licensed capacity usage. This is performed at the expiry of the specific amount of time. During this grace period capacity usage overshoot is allowed. But as mentioned above, upon expiry of this grace period the licensed capacity usage is enforced according to the capacity license limit unless the licensed capacity usage is increased.

This means that by gathering data of capacity usage overshoot over a specific time period, and comparing the measured capacity usage overshoot to a preset value of allowed capacity usage overshoot at the end of the time period or the specific amount of time to determine whether the grace period should be triggered, triggering of the grace period in unwanted situations, such as small capacity usage spikes, can be avoided.

Therefore, this ensures that the grace period cannot be abused by manipulating the capacity license limit to get a further grace period, while at the same time it benefits the customer by allowing several small increases in licensed capacity usage to eventually, when the threshold has been reached, correctly trigger a reset of the grace period. If several small increases would be made without such a threshold, the grace period reset would not be triggered even if the sum of all smaller increases would amount to a valid reset of the grace period.

Step 203

This is an optional step. According to some embodiments, when a grace period has expired, a new grace period cannot be triggered unless the licensed capacity usage for the telecom node has been increased by at least a minimum increase threshold.

Therefore, when the licensed capacity usage has been increased by at least the minimum increase threshold, the telecom node 110 resets the triggered and/or expired grace period to enable that the grace period is triggered again. The minimum increase threshold may e.g. be expressed as a percentage of an original licensed capacity usage that was valid before the latest triggering of the grace period.

Step 204

In some embodiments, the telecom node 110 saves, or stores the increased licensed capacity usage as an original licensed capacity usage, each time a successful step of resetting is performed. This may be a prerequisite for enabling the reset functionality described in step 203.

Figure 3:
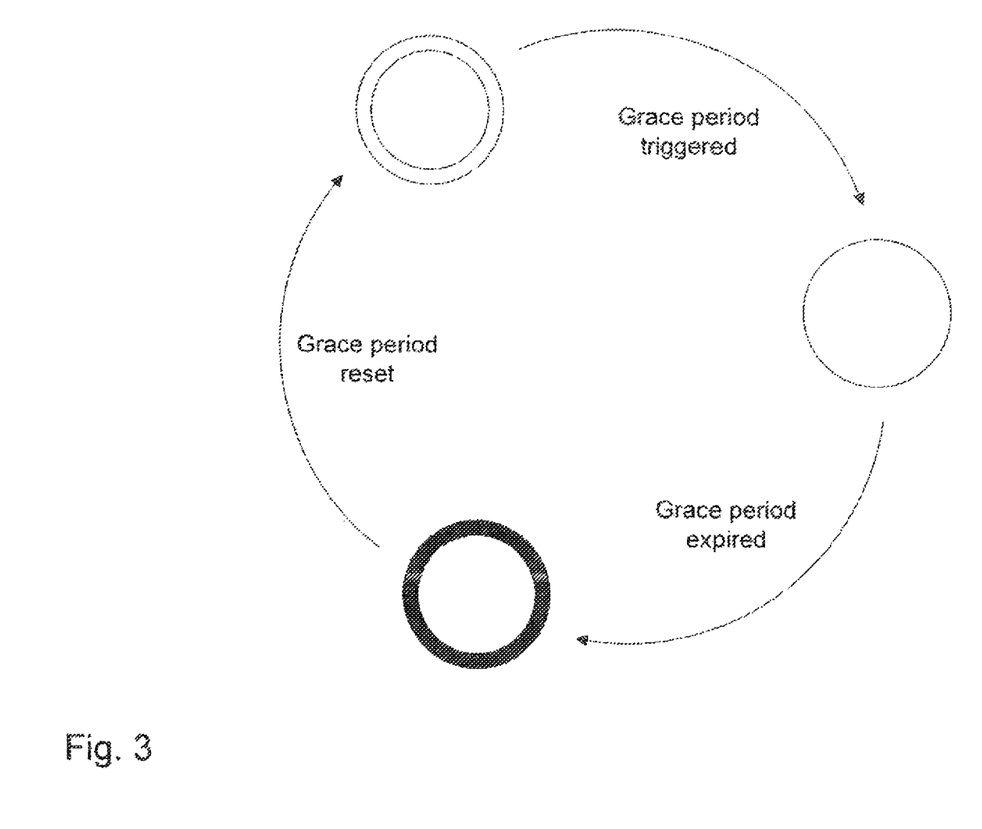
FIG. 3 is a schematic block diagram illustrating states of a grace period.

The grace period control mechanism will now be discussed more in detail. As can be understood from the text above, there may be three states of the grace period, not triggered, triggered, and expired. This is schematically illustrated in FIG. 3.

A grace period control mechanism may advantageously comprise at least two parts, a trigger and a reset mechanism.

The Trigger

Figure 4:
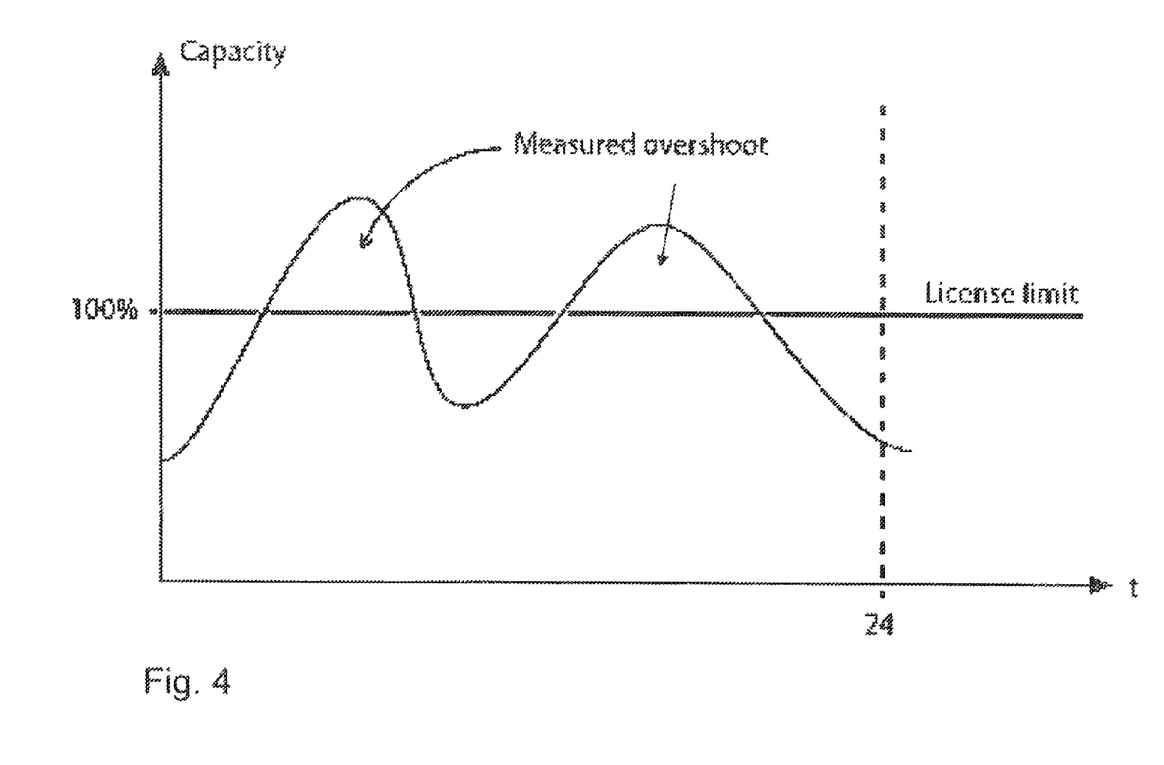
FIG. 4 is a diagram depicting embodiments of a method.

To avoid triggering the grace period in unwanted situations such as e.g., small/brief usage spikes, etc., the triggering mechanism that gathers data of capacity usage overshoot over a specific amount of time (T), see FIG. 4, and the following equation that gives the overshoot is provided in some embodiments.

$$\text{Overshoot[percent]} = \left( \left( \frac{\sum_{k=1}^{N} \max(measuredCapacity_k, licensedCapacity)}{N \cdot licensedCapacity} \right) - 1 \right) \cdot 100$$

In FIG. 4, the horizontal axis represents time, with a vertical dashed line indicating the end of a measurement interval T that started at the origin, and the vertical axis represents capacity usage of the telecom node 110. As shown, capacity usage excursions above and below the capacity license limit representing 100% licensed capacity usage occurred during the measurement interval. In the equation, N is the total number of k capacity usage measurements measuredCapacity$_k$ made during the measurement interval, licensedCapacity is the licensed capacity usage, i.e. 100% in FIG. 4, and max(.) is a function that returns the maximum value in the set of values (.).

When the time T has expired, the measured capacity usage overshoot is compared to a preset threshold value of allowed capacity usage overshoot. If the measured usage overshoot exceeds this preset threshold value, the grace period is triggered.

The Reset Mechanism

When the grace period has been triggered and/or expired, the mechanism also provides a way of resetting that state to not triggered, and enabling a new grace period to be triggered. This can be done by increasing the licensed capacity usage for the telecom node 110.

To ensure that this reset functionality is not misused, a minimum increase threshold e.g., expressed as a percentage of the original licensed capacity usage that was valid before the latest triggering of the grace period, is required to allow a reset.

Each time a successful reset is done, the increased licensed capacity usage may be saved as the original licensed capacity usage. This ensures that small, repetitive increases in licensed capacity usage do not fail to eventually trigger a reset. Also, this ensures that it is not possible to first decrease and then increase the capacity license limit to trigger a false reset of the grace period. The original licensed capacity usage may be saved or stored as read only or secured in any other way.

Figure 5:
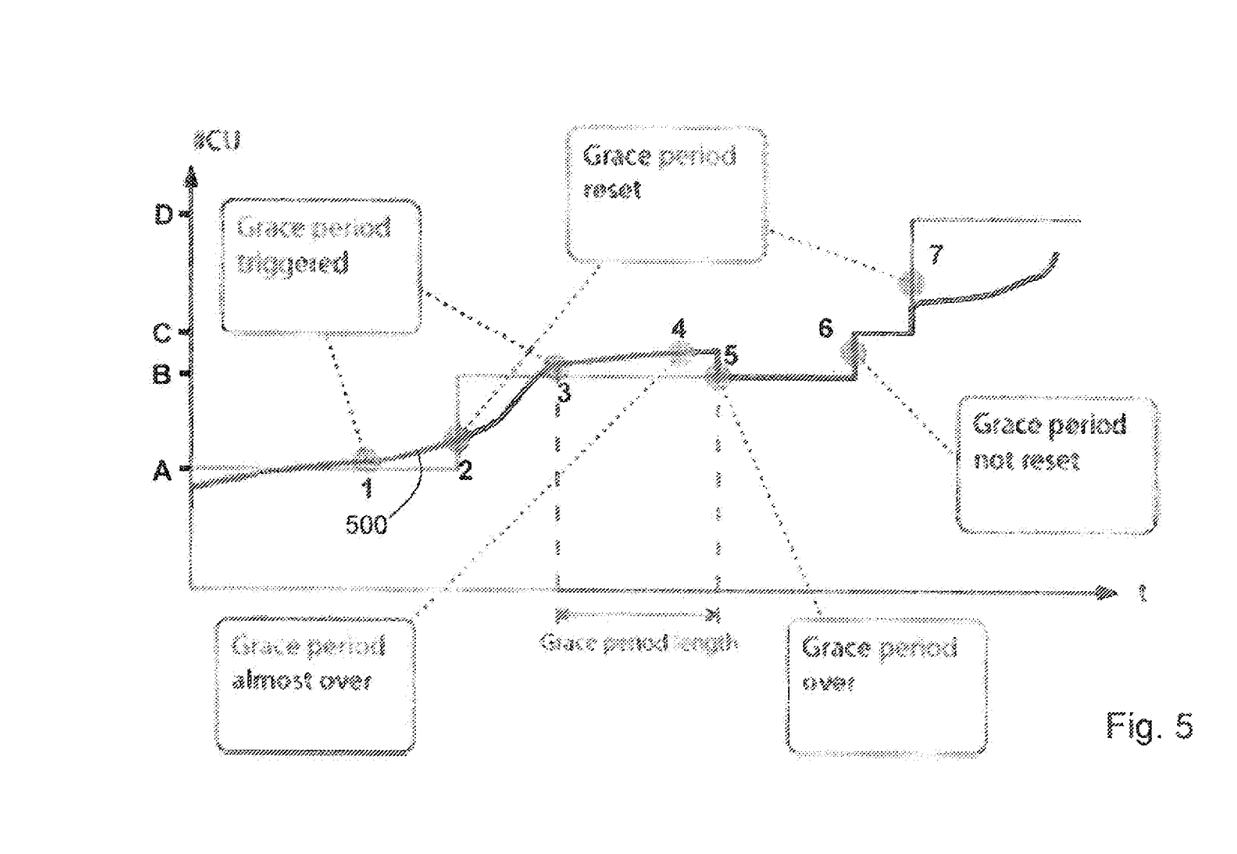
FIG. 5 is a diagram depicting embodiments of a method.

In FIG. 5, a diagram illustrating an example of a scenario of licensed capacity usage and grace period state behaviour over time in the telecom node 110 is shown. In FIG. 5, the horizontal axis represents time, and the vertical axis represents capacity usage of the telecom node 110, expressed in number of connected users (#CU). The capacity license limit is represented by horizontal lines, and the real capacity usage is represented by the curve 500.

The telecom node 110 has obtained licensed capacity usage being associated with a capacity license limit A.

Point 1

The telecom node 110 has measured the capacity usage overshoot according to the capacity license limit A over a specific amount of time. The measured capacity usage has exceeded the preset threshold value of allowed capacity usage overshoot and therefore the grace period is triggered at point 1.

Point 2

The telecom node 110 obtains more capacity usage such that the licensed capacity usage is increased to a capacity license limit B. In this example, the licensed capacity usage has been increased by more than the minimum increase threshold. This means that the telecom node 110 resets the triggered grace period the not triggered state, to enable triggering the grace period again.

Point 3

The telecom node 110 has measured the capacity usage overshoot according to the capacity license limit B over the specific amount of time. The measured capacity usage has exceeded the preset value of allowed capacity usage overshoot and therefore the grace period is triggered again at point 3. During this grace period capacity usage overshoot is allowed.

Point 4

No more capacity usage is obtained by the telecom node 110. The usage capacity is still limited to capacity license limit B. During this grace period capacity usage overshoot is still allowed, but the grace period is almost over.

Point 5

The grace period is over at point 5, and upon expiry of the grace period the licensed capacity usage is enforced according to the capacity license limit B, which means that capacity usage overshoot is not allowed any more.

Point 6

Now a little bit more licensed capacity usage is obtained by the telecom node 110, so that the new capacity license limit is C. But this time the licensed capacity usage has been increased less than the minimum increase threshold. This means that the triggered grace period cannot be reset by the telecom node 110, and therefore triggering the grace period again is not possible.

Point 7

At this point, further more licensed capacity usage is obtained by the telecom node 110, so that the new capacity license limit is D. Now, the licensed capacity usage has been increased by more than the minimum increase threshold. This means that it is possible to reset the triggered grace period by the telecom node 110, to enable triggering the grace period again.

The telecom node 110 may inform the operator, such as the OSS node 130, of key occurrences related to grace periods. These events may be triggered at certain points in time, such as when a grace period is triggered and thus started, when a specific part, e.g. 80%, of the grace period has passed, when a grace period has ended, increased licensed capacity usage, and/or when a grace period has been successfully reset.

There are several advantages of embodiments presented herein including one or more of:
  Operator friendly behavior—does not trigger on one-time capacity usage spike
  Protected against misuse—because of reset threshold.

Figure 6:
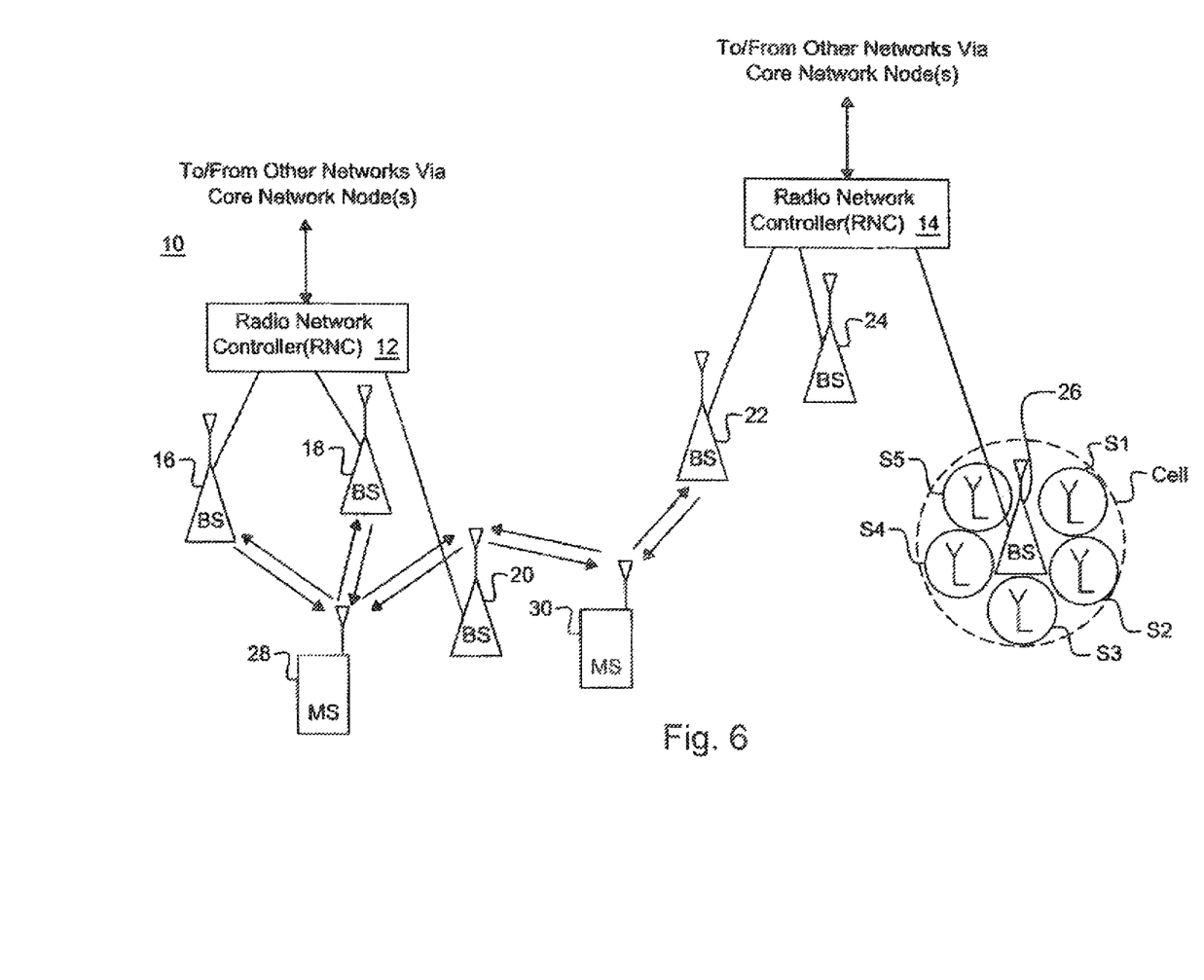
FIG. 6 is a schematic block diagram illustrating embodiments of a network.

FIG. 6 depicts a typical cellular communication system 10 such as a WCDMA communication system. However as mentioned above embodiments herein may also be implemented in e.g. a GSM, an LTE or any other wireless communication system. Radio network controllers (RNCs) 12, 14 controls various radio network functions, including for example radio access bearer setup, diversity handover, etc. In general, each RNC directs calls to and from a User Equipment (UE), such as the user equipment 120, a mobile station (MS), mobile phone, or other remote terminal, via appropriate Base Station(s) (BSs) such as the telecom node 110, which communicate with each other through DL or forward channels, and UL, or reverse channels. In FIG. 6, RNC 12 is shown coupled to BSs 16, 18, 20, and RNC 14 is shown coupled to BSs 22, 24, 26.

Each BS, or eNodeB in an LTE system, serves a geographical area that is divided into one or more cell(s). In FIG. 6, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the Public Switched Telephone Network (PSTN), the internet, etc. through one or more core network nodes, such as a mobile switching centre (not shown) and/or a packet radio service node (not shown).

It will be understood that the arrangement of functionalities depicted in FIG. 6 can be modified in 3G LTE and other communication systems. For example, the functionality of the RNCs 12, 14 can be moved to the eNodeBs 22, 24, 26, and other functionalities can be moved to other nodes in the network. It will also be understood that a base station can use multiple transmit antennas to transmit information into a cell/sector/area, and those different transmit antennas can send respective, different reference signals such as pilot signals.

Figure 7:
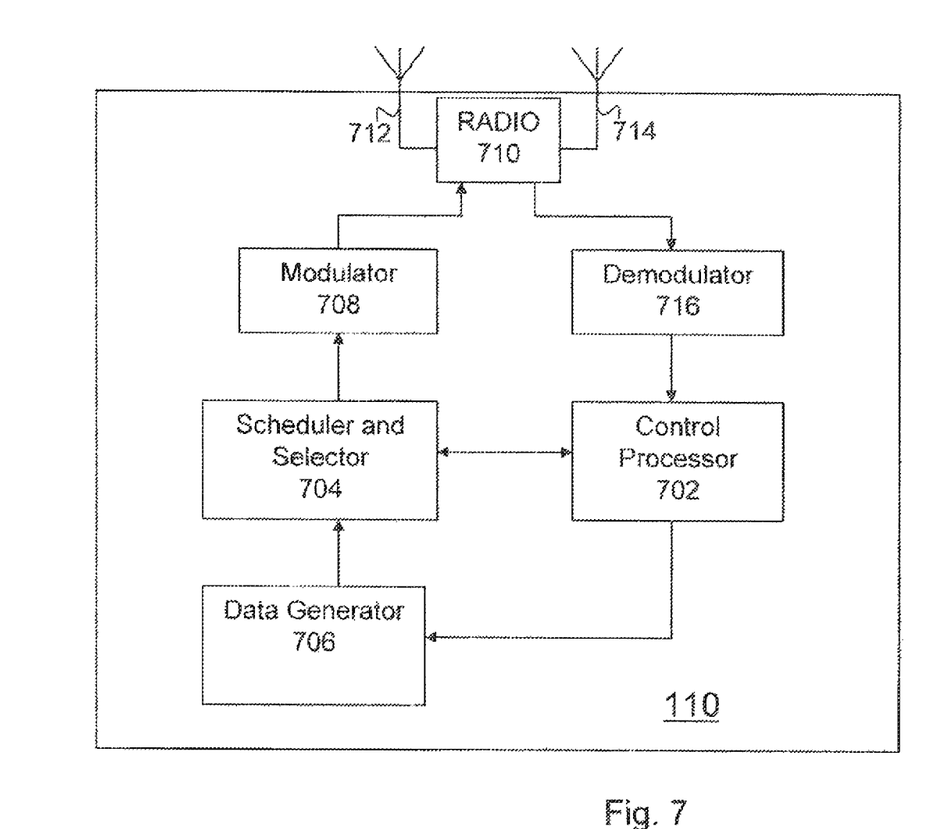
FIG. 7 is a schematic block diagram illustrating embodiments of a telecom node.

FIG. 7 is a block diagram of a portion of the telecom node 110 such as an eNodeB (eNB), which is typical of the BSs and other such nodes in the network that can measure capacity usages and implement the methods described above. It will be appreciated that the functional blocks depicted in FIG. 7 may be combined and re-arranged in a variety of equivalent ways, and that many of the functions can be performed by one or more suitably programmed electronic digital processors and other known electronic circuits.

The telecom node 110 is operated by a control processor 702, which typically and advantageously is a suitably programmed electronic processor. The control processor 702 typically provides and receives control and other signals, including capacity usage measurements or reports, from various devices in the telecom node 110. For simplicity in FIG. 7, the control processor 702 is shown exchanging information with a scheduler and selector 704, which receives digital words to be transmitted to respective user equipments 120 or to be broadcast from a suitable data generator 706. The scheduler and selector 704 implements resource block and resource element (RB/RE) scheduling and selection in an LTE system, for example, and implements code allocation in a WCDMA/HSPA system, for example.

To perform the method steps above for controlling a grace period associated with a licensed capacity usage in the telecom node 110, the telecom node 110 comprises the following arrangement. As mentioned above, the telecom node 110 is comprised in a cellular telephone network 100. The licensed capacity usage is associated with a capacity license limit.

The control processor 702 in the telecom node 110 is configured to measure over a specific amount of time, the capacity usage in the telecom node 110 overshooting the capacity license limit.

The control processor 702 is further configured to trigger a grace period of the licensed capacity usage at the expiry of the specific amount of time when the measured capacity usage exceeds a preset value of an allowed capacity usage overshoot. During the grace period capacity usage overshoot is allowed, and upon expiry of said grace period the licensed capacity usage is enforced according to the capacity license limit unless the licensed capacity usage is increased.

The control processor 702 may further be configured to reset the triggered and/or expired grace period, when the licensed capacity usage has been increased by at least a minimum increase threshold. This is to enable the grace period to be triggered again.

The control processor 702 may further is configured to, each time the grace period is reset, save or store the increased licensed capacity usage as an original licensed capacity usage.

In some embodiments, when the telecom node 110 is a base station in a telecom network, the control processor 702 may further is configured to perform said measurement of capacity usage based on determining a load of the base station by monitoring a buffer status in the base station.

In some embodiments, when the telecom node 110 is an eNodeB in a telecom network according to the LTE, the control processor 702 may further be configured to perform said measurement based on counting resource blocks and/or resource elements transmitted in a subframe, frame, or group of frames, or measure the capacity usage based on counting the number of user equipments connected to the eNodeB.

Hence, the control processor 702 may be configured to monitor the capacity usage of the telecom node 110 such as the eNB, which may be determined in a number of suitable ways. For example, the Resource Blocks (RBs) and Resource Elements (REs) transmitted in a sub-frame, frame, or group of them in a LTE system may be counted, and the capacity usage measurement can be based thereon. A processor such as the control processor 702 may also be configured as a traffic analyzer that determines the load on a the telecom node 110 by monitoring the buffer status without the restrictions of the capacity license limit, e.g., how much data is waiting for available bandwidth to be transmitted to all connected user equipments 120 in relation to the number of RBs and REs being and recently transmitted, and based on that, determine the capacity usage. Based on capacity usage measurements, the processor 702 implements the methods described above.

Information from the scheduler and selector 704 is provided to a modulator 708 that uses the information to generate a modulation signal suitable for the particular communication system. For example, the modulator 708 in an LTE system is an OFDM modulator. The modulation signal generated by the modulator 708 is provided to a suitable radio circuit 710 that generates a wireless signal that is transmitted through at least one transmit antenna 712. Wireless signals transmitted by user equipments 120 are captured by at least one receive antenna 714 that provides those signals to the radio 710 and a demodulator 716. The artisan will understand that the same antenna may be used for transmission and reception in the telecom node 110, as is often done in a user equipment.

It will be understood that the control processor 702 can be configured such that it includes one or more other devices depicted in FIG. 7, which may be implemented by dedicated programmed processors or other suitable logic configured to perform their functions. The combination of the data generator 706, scheduler and selector 704, and modulator 708 produces DL frames or sub-frames to be transmitted. The modulator 708 converts the information into modulation symbols that are provided to the radio 710, which impresses the modulation symbols on one or more suitable carrier signals. In an LTE system for example, the radio 710 impresses the modulation symbols on a number of OFDM subcarriers. The modulated subcarrier signals are transmitted through the antenna 712.

It will be appreciated that the functional blocks depicted in FIG. 7 can be combined and re-arranged in a variety of equivalent ways, and that connections among and information provided or exchanged by the functional blocks can be altered in various ways to enable a telecom node to implement the methods described above and other methods involved in the operation of the node in a digital communication system.

The control unit and other blocks of the telecom node 110 may be implemented by one or more suitably programmed electronic processors, collections of logic gates, etc. that process information stored in one or more memories. The stored information can include program instructions and data that enable the control unit to implement the methods described above. It will be appreciated that the control unit typically includes timers, etc. that facilitate its operations.

It will be appreciated that procedures described above are carried out repetitively as necessary, for example, to respond to the time-varying nature of communication channels between transmitters and receivers. In addition, it will be understood that the methods and apparatus described here can be implemented in various telecom nodes.

Moreover, the embodiments herein may additionally be considered to be represented entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the embodiments herein may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

What is claimed is:

1. A method, implemented in a telecom node of a communications system, for controlling a grace period associated with a licensed capacity usage in the telecom node, wherein the licensed capacity usage is associated with a capacity license limit, the method comprising:
   measuring, in the telecom node and over a specific amount of time, the capacity usage overshooting the capacity license limit;
   when the measured capacity usage exceeds a preset value of an allowed capacity usage overshoot, triggering a grace period of the licensed capacity usage at the expiry of the specific amount of time, during which grace period capacity usage overshoot is allowed; and
   upon expiry of the grace period, enforcing the licensed capacity usage of the telecom node according to the capacity license limit unless the licensed capacity usage is increased.

2. The method of claim 1, further comprising, when the licensed capacity usage has been increased by at least a minimum increase threshold, resetting grace period enable the grace period to be triggered again.

3. The method of claim 2, further comprising saving the increased licensed capacity usage as an original licensed capacity usage each time the grace period is reset.

4. The method of claim 1, wherein:

the telecom node comprises a base station; and measuring the capacity usage in the telecom node overshooting the capacity license limit comprises measuring the capacity usage overshooting the capacity license limit based on determining a load of the base station by monitoring a buffer status in the base station.

5. The method according to claim 1, wherein:

the telecom node of the communications system comprises an eNodeB of a Long Term Evolution communications system; and measuring the capacity usage in the telecom node overshooting the capacity license limit comprises measuring the capacity usage overshooting the capacity license limit based on counting at least one of resource blocks and resource elements transmitted in a subframe, frame, or group of frames.

6. The method according to claim 1, wherein:

the telecom node of the communications system comprises an eNodeB of a Long Term Evolution communications system; and measuring the capacity usage in the telecom node overshooting the capacity license limit comprises measuring the capacity usage overshooting the capacity license limit based on counting the number of user equipments connected to the eNodeB.

7. A telecom node for a communications system, the telecom node for controlling a grace period associated with a licensed capacity usage in the telecom node, wherein the licensed capacity usage is associated with a capacity license limit, the telecom node comprising a control processor configured to:

measure, over a specific amount of time, the capacity usage in the telecom node overshooting the capacity license limit;

when the measured capacity usage exceeds a preset value of an allowed capacity usage overshoot, trigger a grace period of the licensed capacity usage at the expiry of the specific amount of time, during which grace period capacity usage overshoot is allowed; and upon expiry of the grace period, enforce the licensed capacity usage according to the capacity license limit unless the licensed capacity usage is increased.

8. The telecom node of claim 7, wherein the control processor is further configured to, when the licensed capacity usage has been increased by at least a minimum increase threshold, reset the grace period to enable the grace period to be triggered again.

9. The telecom node of claim 8, wherein the control processor is further configured to save the increased licensed capacity usage as an original licensed capacity usage each time the grace period is reset.

10. The telecom node of claim 7, wherein the telecom node comprises a base station, and wherein the control processor is configured to measure the capacity usage in the telecom node overshooting the capacity license limit by determining a load of the base station by monitoring a buffer status in the base station.

11. The telecom node according to claim 7, wherein:

the telecom node for the communications system comprises an eNodeB for a Long Term Evolution communications system; and the control processor is configured to measure the capacity usage in the telecom node overshooting the capacity license limit by measuring the capacity usage overshooting the capacity license limit based on counting at least one of resource blocks and resource elements transmitted in a subframe, frame, or group of frames.

12. The telecom node according to claim 7, wherein:

the telecom node for the communications system comprises an eNodeB for a Long Term Evolution communications system; and the control processor is configured to measure the capacity usage in the telecom node overshooting the capacity license limit by measuring the capacity usage overshooting the capacity license limit based on counting the number of user equipments connected to the eNodeB.

\* \* \* \* \*